Aug. 22, 1944.   S. G. OSBORNE ET AL   2,356,345
METHODS OF STORING AND CONCENTRATING ANHYDROUS HYDROGEN CHLORIDE
Filed Dec. 18, 1941
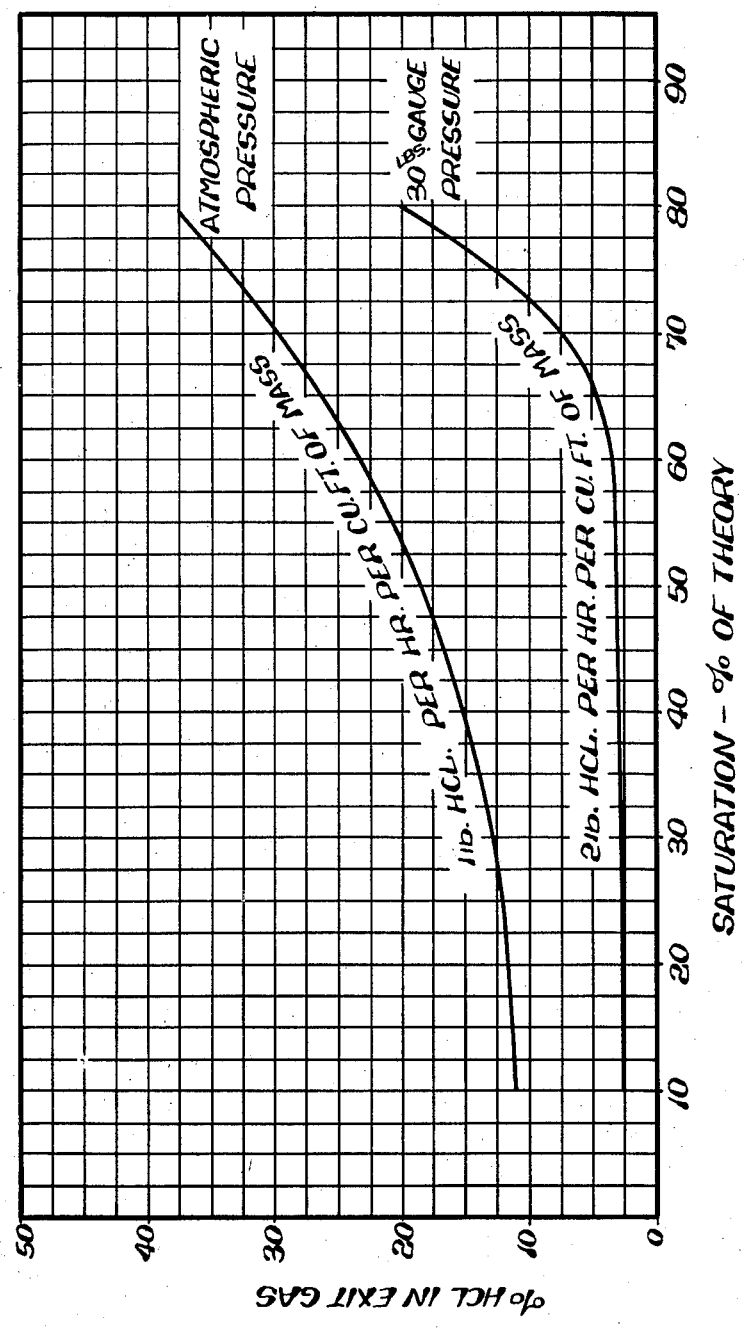
INVENTOR
Sidney G. Osborne
BY Aylmer H. Mando
Kenneth E. Stuart
ATTORNEY Patented Aug. 22, 1944

2,356,345

UNITED STATES PATENT OFFICE 2,356,345

METHOD OF STORING AND CONCENTRATING ANHYDROUS HYDROGEN CHLORIDE

Sidney G. Osborne, St. Davids, Ontario, Canada, and Aylmer H. Maude, Niagara Falls, N. Y., assignors to Hooker Electrochemical Company, Niagara Falls, N. Y., a corporation of New York Application December 18, 1941, Serial No. 423,446

1 Claim. (Cl. 23—154)

It is known that certain materials form addition compounds with anhydrous hydrogen chloride and that the hydrogen chloride may be subsequently recovered for use as required by application of heat to the compound. Among the materials known to form such addition compounds are certain salts of heavy metals, such as cupric chloride, copper, lead, cadmium, silver, mercury, tin, bismuth and antimony sulphate, phosphate, phosphite and hypophosphite and thallium and ferric phosphate. Many of these salts are heavy or expensive or give off the HCl at an inconveniently high temperature. Copper, lead and stannous sulphates form the stable addition compounds $CuSO_4.2HCl$, $PbSO_4.2HCl$ and $SnSO_4.1.5HCl$. The temperatures at which these compounds begin to give off the HCl depend upon the degree of saturation, but at atmospheric pressure, and in an atmosphere of HCl, they will be found to have given off most of the HCl at 130° C. These salts are therefore at present among the preferred salts for our purpose.

However, these salts, when dehydrated, are generally powdery and hygroscopic. The carrying out of the absorption and desorption therefore involves considerable difficulty. In U. S. Patent No. 2,234,738 there is described a method and apparatus for overcoming this difficulty, which comprises impregnating inert porous granular or plastic material with an aqueous solution of the salt and then driving off the water so as to leave the salt distributed throughout the material. The material thus impregnated is enclosed in an air tight container, thus excluding moisture. In the patent, the materials mentioned are "Alfrax," "Alundum," pumice and clay. These materials are largely composed of aluminum oxide or silicate. In co-pending application Serial No. 423,444, filed simultaneously herewith, there is disclosed an inert porous material stated to be of superior resistance to the action of anhydrous hydrogen chloride over long periods of use; namely infusorial earth. This contains very little aluminum and is largely silicon dioxide. It may be impregnated with the salt as a powder and remain in powdered form afterward, or it may be compacted by means of a binder, preferably sodium silicate, dried, crushed and granulated, and then impregnated with the salt. In co-pending application Serial No. 423,445 filed simultaneously herewith there is disclosed a container in which the absorptive material may be used in powdered form, and for this purpose the salt may be used by impregnating powdered infusorial earth with it, or it may be dehydrated at a temperature leaving it in powdery form and used by itself, without any inert porous supporting material.

In the patent it is stated that the gas is forced into the pores of the porous material, thus implying that it is supplied under pressure. However, the pressure is only that corresponding to the resistance of the solid block of absorptive material, and affects the physical state of the gas only at the entering end. At the exit end of the container the pressure is negligible. It is also stated in the patent that pressure does not increase the total absorption of the gas, since this is a function solely of the chemical composition of the addition compound formed.

We now find, however, that the rate of absorption and percentage of recovery of the gas may be materially increased by supplying it at substantial pressure, especially when the absorptive material is of a loose, powdery or granular nature, permitting the gas to contact it everywhere at substantially the same pressure. If the gas is dilute the hydrogen chloride is selectively absorbed out of the mixture and the pressure is maintained by controlling the escape of the diluent gases at the exit. By means of the "Nash Hydroturbine," a rotary device which compresses gases by means of a liquid piston, such as concentrated sulphuric acid, it is practicable to compress hydrogen chloride up to a pressure of about 35 lbs. per sq. in. At 30 lbs. per sq. in. the rate of absorption of the gas is multiplied several times. Moreover, the completeness of absorption is increased at the same time; that is to say, when charging the container with dilute gas under pressure the percentage of hydrogen chloride in the exit gas is reduced, for a given rate of charging, as compared with the percentage when charging at atmospheric pressure.

The effect of charging under pressure is illustrated in the graphs, in which percentage of HCl in the exit gas is plotted against percentage of theoretical saturation, when charging HCl gas of a concentration of 60 per cent by volume (the balance being air), at room temperature into an absorptive mass consisting of infusorial earth, in granular form, impregnated with copper sulphate. From this graph it will be seen that when charging at atmospheric pressure at the rate of 1 lb. of HCl per hour per cubic foot of absorptive mass, at 75 per cent of theoretical saturation, which is the practical limit, the exit gas contains 35 per cent HCl. When charging under a pressure of 30 lbs. gauge, on the other hand, and at the rate of 2 lbs. of HCl per hour per cubic foot of mass, or twice the previous charging rate, at 75 per cent of saturation the exit gas contains 12½ per cent HCl. This does not mean that the absorptive mass can be charged at atmospheric pressure at the rate of 1 lb. of HCl per hour per cubic foot. Under these conditions the mean HCl content of the exit gases from start to 75 per cent saturation would be about 20 per cent. This is too much HCl to be allowed to go to waste. At atmospheric pressure the highest economical charging rate is therefore about ½ lb. per hour per cubic foot of mass. Neither does the graph mean that when charging under 30 lbs. pressure at the rate of 2 lbs. HCl per hour per cubic foot of mass the exit gas contains 12½ per cent HCl throughout the operation. As a matter of fact, the mean HCl content of the exit gas under these conditions is only about 4.7 per cent. This quantity of HCl can be absorbed in water or allowed to go to waste without serious loss.

In other words, by increasing the pressure of the gas in the interstices of the absorptive mass from atmospheric pressure to 30 lbs. per sq. in. gauge, the rate of absorption is increased at least fourfold. At a considerably lower pressure, such as 10 lbs. gauge, a very useful gain in charging rate may be realized. This is of great importance, as the rate of charging determines the capacity of a given installation for concentrating hydrogen chloride.

We claim as our invention:

The method of recovering concentrated hydrogen chloride from its anhydrous mixtures with substantial quantities of air to leave in the residual mixture a mean hydrogen chloride content amounting to not more than 4.7 per cent thereof from start to finish of the operation, which comprises forcing the mixture, containing initially not less than 60 per cent hydrogen chloride, through a mass of infusorial earth impregnated with copper sulphate at not substantially above room temperature and at a pressure of not less than 30 pounds per square inch gauge and rate of not more than 2 pounds of hydrogen chloride per hour per cubic foot of mass, until the mass has absorbed hydrogen chloride up to 75 per cent of its ultimate capacity, and subsequently heating the mass to re-evolve concentrated hydrogen chloride therefrom.

SIDNEY G. OSBORNE.
AYLMER H. MAUDE.